United States Patent
Haerter

(10) Patent No.: US 12,228,208 B2
(45) Date of Patent: Feb. 18, 2025

(54) TRANSMISSION DEVICE HAVING A SHAFT

(71) Applicant: MERCEDES-BENZ GROUP AG, Stuttgart (DE)

(72) Inventor: Tobias Haerter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/574,402

(22) PCT Filed: May 3, 2022

(86) PCT No.: PCT/EP2022/061787
§ 371 (c)(1),
(2) Date: Dec. 27, 2023

(87) PCT Pub. No.: WO2023/274602
PCT Pub. Date: Jan. 5, 2023

(65) Prior Publication Data
US 2024/0288068 A1 Aug. 29, 2024

(30) Foreign Application Priority Data
Jun. 28, 2021 (DE) ...................... 10 2021 003 333.7

(51) Int. Cl.
F16H 63/32 (2006.01)
F16H 63/30 (2006.01)

(52) U.S. Cl.
CPC ..... *F16H 63/32* (2013.01); *F16H 2063/3093* (2013.01); *F16H 2063/324* (2013.01)

(58) Field of Classification Search
CPC .... F16D 11/14; F16D 2011/002; F16D 11/10; F16D 2011/004; F16H 3/006; F16H 63/32; F16H 2063/3093
(Continued)

(56) References Cited

U.S. PATENT DOCUMENTS 3,827,276 A * 8/1974 Willers ................... F16H 63/04
74/363
7,370,742 B2 5/2008 Rüdle
2019/0360535 A1 11/2019 Reisch et al.

FOREIGN PATENT DOCUMENTS

DE 2157153 A1 5/1972
DE 102004049274 B4 2/2013
(Continued)

OTHER PUBLICATIONS

International Search Report and Written Opinion mailed Sep. 12, 2022 in related/corresponding International Application No. PCT/EP2022/061787.
(Continued)

*Primary Examiner* — Victor L MacArthur
(74) *Attorney, Agent, or Firm* — PATENT PORTFOLIO BUILDERS PLLC

(57) ABSTRACT

A transmission device includes a shaft and two idler gears having gear toothings arranged coaxially with respect to an axis of rotation of the shaft and axially next to each other on the shaft. A switch element is fixed against rotation and arranged axially shiftably in relation to a first idler gear. With regard to the axis of rotation of the shaft, the switch element extends axially from between the two gear toothings up to a side of the first idler gear facing away from the second idler gear. The first idler gear has a passage through which the switch element passes in the axial direction. The switch element has a first switch toothing arranged axially between the idler gears and a second switch toothing arranged on the side of the first idler gear facing away from the second idler gear. The first switch toothing is connected to the second switch toothing in a manner fixed against rotation.

10 Claims, 2 Drawing Sheets

(58) Field of Classification Search
USPC .......................................... 74/373; 192/69.9
See application file for complete search history.

(56) References Cited

FOREIGN PATENT DOCUMENTS

| EP | 2302245 B1 | 4/2012 |
|----|------------|--------|
| FR | 1559393 A  | 3/1969 |
| FR | 2830300 A1 | 4/2003 |
| GB | 411984 A   | 6/1934 |
| GB | 1344115 A  | 1/1974 |

OTHER PUBLICATIONS

Office Action created Feb. 8, 2022 in related/corresponding DE Application No. 10 2021 003 333.7.
Office Action dated Nov. 19, 2024 in related/corresponding JP Application No. 2023-580478.

* cited by examiner

TRANSMISSION DEVICE HAVING A SHAFT

BACKGROUND AND SUMMARY OF THE INVENTION

Exemplary embodiments of the invention relate to a transmission device having a shaft.

Transmission devices having a shaft and having a so-called special switch element are known from the prior art, for example from DE 21 57 153 A and EP 2 302 245 B1. Thus, for example, the relevant patent document DE 10 2004 049 274 B4 of the applicant describes such a special switch device, which is there formed in two parts. The parts are connected to each other in the axial direction of the shaft, and one of the parts is connected to the shaft in a manner fixed against rotation via a synchronization body. All the features of the switch device of the patent document thus result from the preamble of the valid main claim.

In practice, it is frequently the case that not all gears are built into all transmissions. If a transmission is modified by omitting only one of the gears, for example the fastest transmission ratio, as the highest gear, then the problem can frequently result that the switch elements previously used can still be used, but require a comparatively large amount of installation space, as they now only need to fulfil a part of their functionality. Thus, for example, two switch elements having two shift forks can be present, which are both moved only in an axial direction. This is disadvantageous with regard to the required components, the required space and weight. In addition, it is a decided disadvantage in such structures that more actuators than are actually necessary are required to obtain the desired gear changes.

For this reason, the object of the present invention is to disclose an improved transmission device having such a special switch element, which guarantees a high flexibility while effectively utilizing the available installation space.

The transmission device according to embodiments of the invention now uses the switch element, which can be shifted in the axial direction of the shaft in a similar manner as in the relevant prior art, in such a way that the switch element passes through a passage in the first idler gear and has a switch toothing on both sides of the idler gear through which it passes. The transmission device according to the invention uses the switch element passing through one of the idler gears in such a way that the switch element has two switch toothings that are fixed against rotation and that can couple the two idler gears with each other or couple one of the idler gears with the shaft in a manner fixed against rotation when required.

In the context of the present invention, a switch toothing should be understood to mean a toothing which, as a toothing of an idler gear, can be brought into engagement with a corresponding switch toothing of a switch element. The switch element itself can be arranged axially shiftably. The switch toothing in the switch element and the switch toothing in the gear wheel are arranged coaxially with each other.

A connection fixed against rotation is a connection between two elements which are rotatably mounted and arranged coaxially with each other, and which are thus connected to each other or arranged in a manner fixed against rotation in relation to each other such that, due to their connection, they revolve or rotate at the same angular velocity.

Both the axial direction and the radial direction always relate to the axis of rotation of the transmission device, and thus in particular the axis of rotation of the shaft. Here, elements that are arranged axially next to each other means that no further element of the same type is arranged between these two elements. Thus, the two idler gears arranged axially next to each other do not have a further gear wheel, in particular do not have a further idler gear between them.

According to a very advantageous development of the transmission device according to the invention, it is the case that the at least one passage through the first idler gear is arranged radially within the first gear toothing. This guarantees a compact structure, which makes it possible for the switch element which is radially within the gear toothing of the first idler gear to pass through the latter. In the context of the invention, radially within should always be understood to mean that a reference point to which radially within relates is arranged in a region with a larger radius with regard to an axis of rotation than the element lying radially within. It thus lies in a region of a smaller radius, and thus peripherally on the inside of the element carrying the gear toothing.

A gear toothing should be understood to mean the toothing of an idler gear which, to form a transmission gear, engages or can be brought into engagement with the toothing of another gear wheel, for example a fixed gear, of which the axis of rotation is arranged in parallel and axially offset with the gear wheel, here the idler gear, having the gear toothing.

A further exceptionally favorable embodiment of the transmission device according to the invention further provides that the switch element has a splined shaft toothing in the switch element, by means of which the switch element is permanently coupled with the first idler gear in a manner fixed against rotation but axially shiftably, wherein the splined shaft toothing in the switch element is formed separately from the second switch toothing in the switch element. An arrangement of the switch element in a manner fixed against rotation in relation to the first idler gear is thus guaranteed via the splined shaft toothing. The splined shaft toothing in the switch element can advantageously form the first switch toothing in the switch element. The splined shaft toothing in the switch element can however also be formed separately from the first switch toothing in the switch element. In this embodiment of the transmission device according to the invention, the first idler gear is then the synchronization body.

A further very advantageous embodiment of the transmission device according to the invention additionally provides that the switch element has a groove arranged axially between the idler gears and in which a shift fork can engage. This groove, which is equipped to engage with a shift fork, thus makes it possible to move the switch element in the axial direction via a shift fork in a manner known in principle, and thus to move the switch element into different axial positions, in which different elements engage, and different switch states can thus be implemented.

In an advantageous embodiment according to the invention, the transmission device provides that the first idler gear has several passages for the switch element, the passages being evenly distributed over the periphery. Via such a plurality of passages, which are arranged evenly distributed over the periphery, an even distribution of the forces over the periphery results both in relation to the switch element and in relation to the first idler gear, which is advantageous with regard to the load and uniform wall thicknesses, and additionally prevents an imbalance which would otherwise be a cause for concern when the components rotate, or makes the balancing correspondingly simple.

A further very advantageous embodiment of the transmission device according to the invention further provides that the first switch toothing and the second switch toothing, respectively in the switch element, are aligned radially inwards with regard to the axis of rotation of the shaft. This thus means that the tooth tips of the switch toothing in the switch element lie on a shorter radius than the tooth valleys. This enables a very compact structure, in which the corresponding part of the switch element can be very easily built over radially on the outside, such that a very compact structure can be implemented via the advantageous embodiment with the switch toothings aligned radially inwards.

According to a further very advantageous embodiment of the transmission device according to the invention, the splined shaft toothing in the switch element is aligned radially inwards with regard to the axis of rotation of the shaft. This splined shaft toothing can therefore also be aligned inwards, such that, in this particularly favorable construction of the two aforementioned embodiments of the transmission device according to the invention, the entire switch element does not have any toothings aligned outwards, and instead, in a particularly favorable embodiment, both its two switch toothings and the splined shaft toothing are aligned inwards. This makes the arrangement of further elements radially outside of the switch element considerably easier, such that the switch element can ideally be built over radially on the outside, save for the ability to access the groove aligned to engage with the shift fork.

As already indicated, the first switch toothing can be designed to couple the first idler gear, which is coupled with the first switch element in a manner fixed against rotation, with the second idler gear in a manner fixed against rotation in a first axial position of the switch element. The first switch toothing thus engages in an idler gear switch toothing of the second idler gear, in order to thus to couple the switch element itself and the second idler gear in a manner fixed against rotation. Via the switch element, which, according to the preferred development described above, is in any case coupled with the first idler gear in a manner fixed against rotation via the splined shaft toothing, the two idler gears are thus connected to each other in a manner fixed against rotation. In another axial position of the switch element, however, it can also be provided that the second switch toothing is designed to couple the switch element and the first idler gear connected to it in a manner fixed against rotation with the shaft in a manner fixed against rotation. In the first axial position, the first idler gear can thus be coupled with the second idler gear in a manner fixed against rotation, and in the second axial position, first idler gear can be coupled with the shaft. In addition, a kind of neutral position can be provided, in which the two idler gears revolve freely, because, in this third axial position with regard to the shaft, the switch element is equipped to revolve freely with the first idler gear, with which it is coupled in a manner fixed against rotation regardless, without coupling the second idler gear with the switch element, such that said second idler gear can also revolve freely.

Further advantageous embodiments of the transmission device according to the invention also result from the exemplary embodiment, which is depicted in more detail in the following with reference to the figures.

BRIEF DESCRIPTION OF THE DRAWINGS

Here.

DETAILED DESCRIPTION

Figure 1:
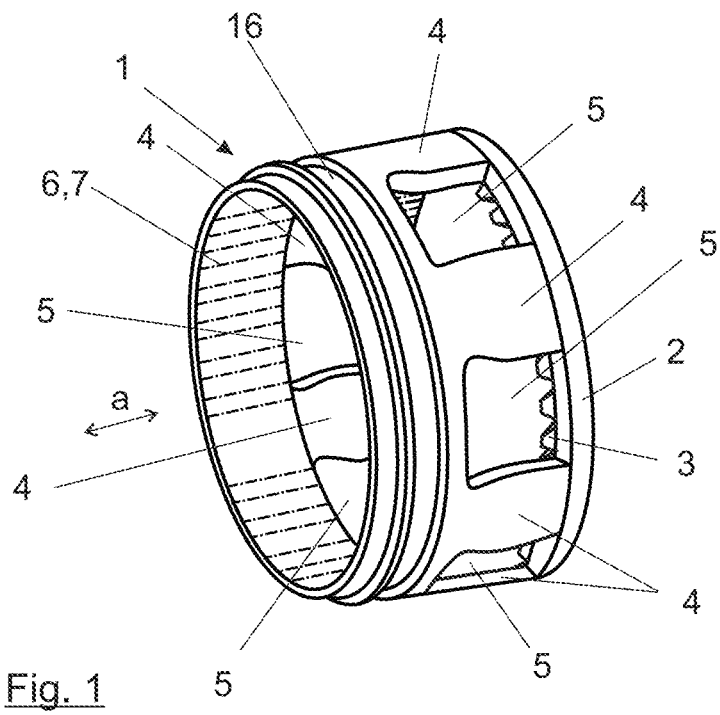
FIG. 1 shows a schematic three-dimensional view of a possible switch element of a transmission device according to the invention.
Figure 3:
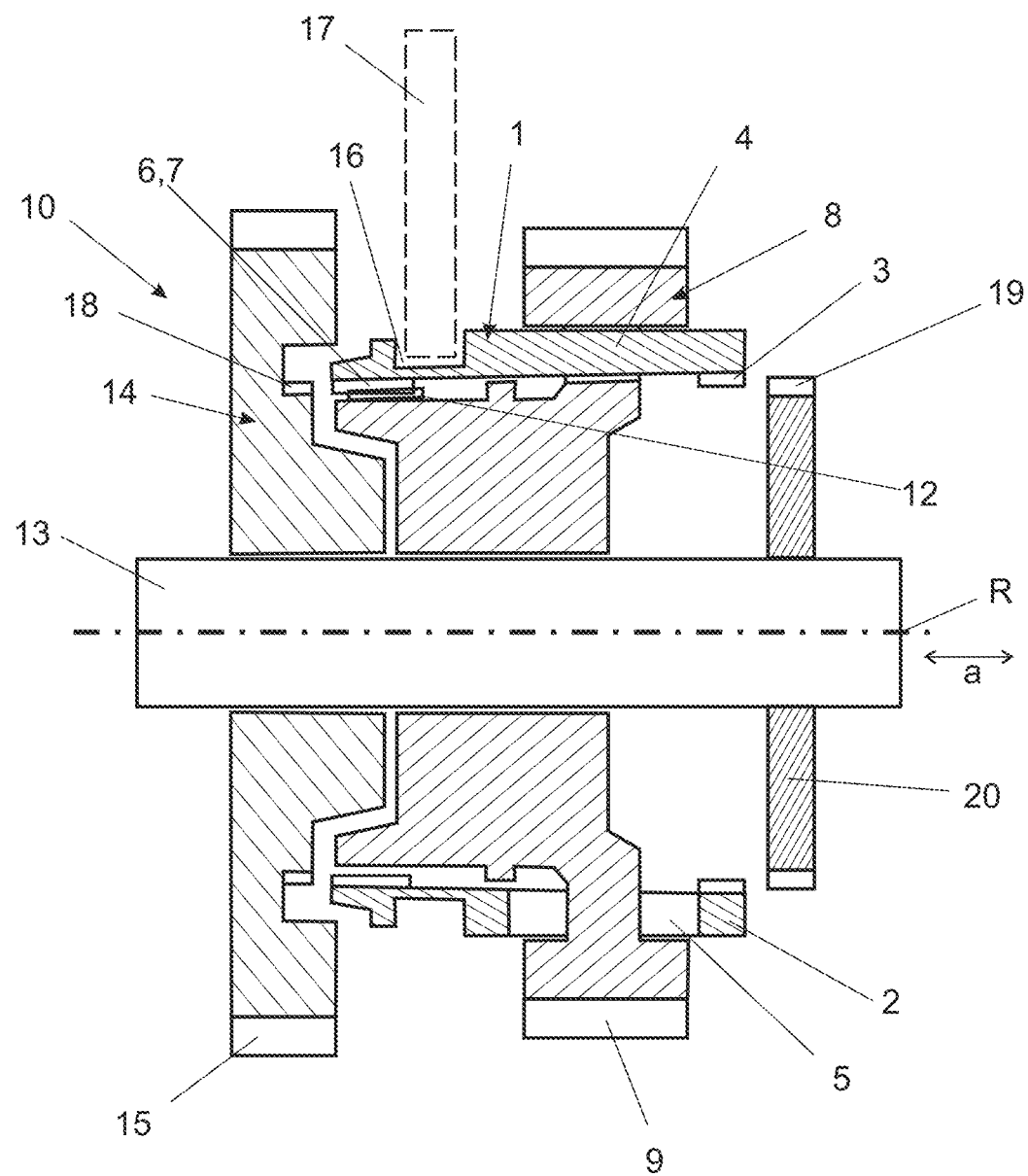
FIG. 3 shows a sectional depiction of a possible embodiment of the transmission device in a very schematic view.

In the depiction of FIG. 1, in a possible embodiment for a transmission device 10 according to the invention, a switch element labelled 1, which can be seen in FIG. 3 is depicted. The switch element 1 is formed rotationally symmetrically and, on its right-hand side in the depiction of FIG. 1, comprises a partial element labelled 2 with a second switch toothing 3 aligned radially inwards. This is adjoined by a rotationally symmetrical body having several spokes 4 and apertures 5 arranged alternately with the spokes 4. On the side of the switch element 1 lying opposite the partial element 2 in the axial direction a, a first switch toothing labelled 6 of the switch element 1 is indicated by the dashed lines. This first switch toothing is also aligned inwards. A splined shaft toothing 7 is additionally arranged in the region of the spokes 4 and is indicated via dashed lines in the aperture 5 depicted above in the depiction of FIG. 1.

Figure 2:
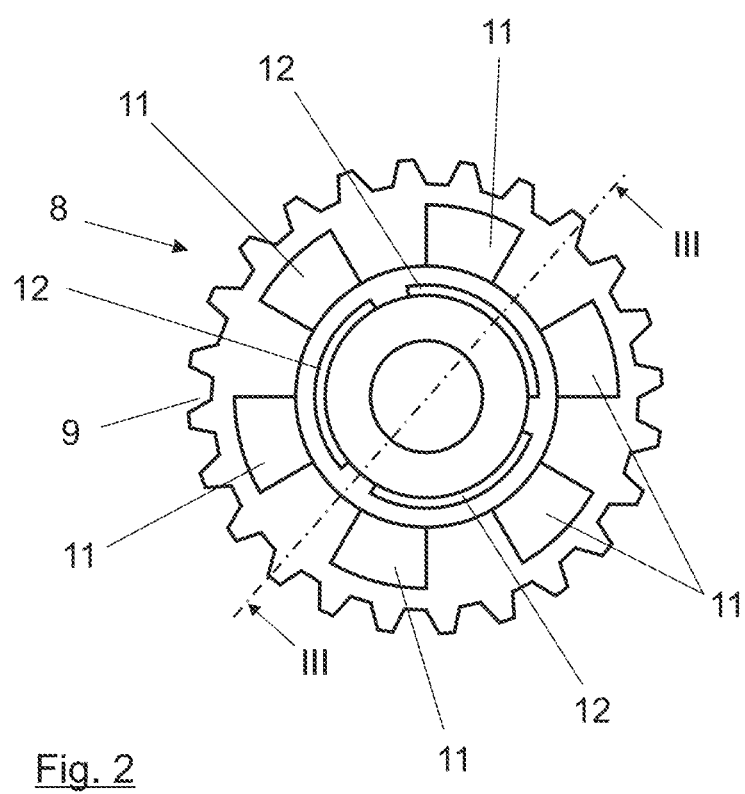
FIG. 2 shows a very schematic side view of a first idler gear in a possible embodiment of the transmission device according to the invention.

The switch element 1 works together with a first idler gear 8, which can be seen in a side view in the axial direction a in the depiction of FIG. 2. The idler gear 8 has a first gear toothing 9 on the outer periphery. Individual passages 11 can be seen radially within this first gear toothing 9. In the later assembled state, the spokes 4 of the switch element 1 protrude through these passages 11, with the switch element, during assembly, being mounted on the first idler gear 8 from the direction of view depicted in FIG. 2 by the structure of the switch element 1, still without the partial element 2, being pushed on such that the spokes 4 pass through the passages 11 of the first idler gear 8, and the part provided with the first switch toothing 6 comes to lie on the side of the observer. The partial element 2 is then arranged on the back of the first idler gear 8 from the perspective of the observer, and connected, for example welded, to the spokes 4. The splined shaft toothing 7 of the switch element 1 comes into contact with an idler gear splined shaft toothing 12 of the first idler gear 8, which is here formed in three parts around the periphery. The switch element 1 can thus be shifted in the axial direction a in relation to the first idler gear 8, towards or away from the observer in relation to FIG. 2, but is connected to this first idler gear 8 in a manner fixed against rotation due to the splined shaft toothing 7 in the switch element and the corresponding splined shaft toothing 12 on the side of the first idler gear 8. The axial displacement path is delimited by the size of the apertures 5 and the thickness of the idler gear 8 in the region between the passages 11.

In the depiction of FIG. 3, the transmission device 10 can be seen in a schematic sectional depiction, as already mentioned above. The section is analogous to the line Ill-Ill in FIG. 2. The first idler gear 8 having the first gear toothing 9 thus serves as a synchronization body connected to the switch element 1 via the splined shaft toothing 7, 12 in a manner fixed against rotation, wherein the first idler gear 8 revolves on a shaft 13 which rotates around its axis of rotation R. The first idler gear 8 is arranged coaxially on this shaft 13. A second idler gear 14 is additionally arranged coaxially on the shaft 13 next to the first idler gear 8. This second idler gear also has a gear toothing 15, the second gear toothing. The mounting of the idler gears 8, 14 on the shaft 13 is not depicted.

The switch element 1 has a groove 16, which can thus also be seen in the depiction of FIG. 1. A shift fork 17 indicated in the depiction of FIG. 3 can engage in a known manner in this groove 16, which lies between the two idler gears 8 and 14. Via this shift fork 17, the switch element 1 can be shifted out of the position shown here, which is a quasi-neutral position, and is described in the following as a third axial position, either to the right into a second axial position or to the left into a first axial position. Shifting into the first axial position would cause the first switch toothing 6 to come into engagement with a first switch toothing 18 in the region of the second idler gear 14 on the side of the switch element 1. This leads the switch element 1 to be coupled with the second idler gear 14 in a manner fixed against rotation, because the two switch toothings 6, 18 engage in each other. The switch element 1 is further connected to the first idler gear 8 serving as a synchronization body via the splined shaft toothing 7, 12, such that, in this first axial position of the switch element 1, and thus the axial position of the switch element 1 shifted to the left in relation to the depiction of FIG. 3, the two idler gears 8, 14 are coupled with each other in a manner fixed against rotation and can revolve together in relation to the shaft 13.

To obtain the second axial position, the switch element 1 is shifted to the right in the axial direction a in the depiction of FIG. 3 beyond the third axial position shown in FIG. 3. If the splined shaft toothing 7, 12 is still engaged, and thus if the first idler gear 8 is connected to the switch element 1 in a manner fixed against rotation, the second switch toothing 3 on the partial element 2 of the switch element 1 now engages in a switch toothing 19 in the shaft, which is here connected to the shaft 13 in a manner fixed against rotation via an intermediate gear 20.

Via this engagement of its second switch toothing 3 with the switch toothing 19 in the shaft, the switch element 1 is thus coupled with the shaft 13 in a manner fixed against rotation, and correspondingly revolves with the shaft 13. Because the splined shaft toothing 7, 12 is still engaged, the switch element 1 remains coupled with the first idler gear 8 in a manner fixed against rotation, such that the first idler gear 8 also revolves with the shaft 13 in a manner fixed against rotation. The switch element 1 itself, which extends in the axial direction a from a region between the two idler gears 8, 14 up to a region of the first idler gear 8 facing away from the second idler gear 14, is exceptionally compact and efficient, and can thus correspondingly be built over in the regions in which no access is necessary for the shift fork 17, and thus in particular to the right of the groove 16 in the depiction of FIG. 3, which has been realized here via the first idler gear 8, and which would also be possible without issue via further elements in the region on the right next to the first idler gear.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A transmission device comprising:
   a shaft;
   first and second idler gears arranged coaxially with respect to an axis of rotation of the shaft and axially next to each other on the shaft, wherein the first idler gear has a first gear toothing and the second idler gear has a second gear toothing;
   a switch element fixed against rotation and arranged axially shiftably with respect to the first idler gear,
   wherein the first idler gear has at least one passage through which the switch element passes through in the axial direction,
   wherein the switch element has a first switch toothing arranged axially between the first and second idler gears and a second switch toothing arranged on the side of the first idler gear facing away from the second idler gear,
   wherein the first switch toothing is connected to the second switch toothing in a manner fixed against rotation,
   wherein tooth tips of the first and second switch toothing extend radially inward, with regard to the axis of rotation of the shaft, from an interior of the switch element.

2. The transmission device of claim 1, wherein the at least one passage is arranged radially within the first gear toothing.

3. The transmission device of claim 1, wherein the switch element has a groove arranged axially between the first and second idler gears, and the transmission device includes a shift fork that is engageable in the groove to shift the switch element in the axial direction.

4. The transmission device of claim 1, wherein the at least one passage of the first idler gear comprises several passages evenly distributed over a periphery of the first idler gear.

5. The transmission device of claim 1, wherein an entirety of the switch element does not have any outwardly aligned toothings.

6. A transmission device comprising:
   a shaft;
   first and second idler gears arranged coaxially with respect to an axis of rotation of the shaft and axially next to each other on the shaft, wherein the first idler gear has a first gear toothing and the second idler gear has a second gear toothing;
   a switch element fixed against rotation and arranged axially shiftably with respect to the first idler gear,
   wherein the first idler gear has at least one passage through which the switch element passes through in the axial direction,
   wherein the switch element has a first switch toothing arranged axially between the first and second idler gears and a second switch toothing arranged on the side of the first idler gear facing away from the second idler gear, wherein the first switch toothing is connected to the second switch toothing in a manner fixed against rotation,
wherein the switch element has a splined shaft toothing in the switch element, wherein the splined shaft toothing is configured so that the switch element is permanently coupled with the first idler gear in a manner fixed against rotation and axially shiftably, wherein the splined shaft toothing in the switch element is formed separately from the second switch toothing in the switch element, and
wherein tooth tips of the first and second switch toothing extend radially inward, with regard to the axis of rotation of the shaft, from an interior of the switch element.

7. The transmission device of claim 6, wherein tooth tips of the splined shaft toothing in the switch element extend radially inwards, with regard to the axis of rotation of the shaft, from the interior of the switch element.

8. A transmission device comprising:
a shaft;
first and second idler gears arranged coaxially with respect to an axis of rotation of the shaft and axially next to each other on the shaft, wherein the first idler gear has a first gear toothing and the second idler gear has a second gear toothing;
a switch element fixed against rotation and arranged axially shiftably with respect to the first idler gear,
wherein the first idler gear has at least one passage through which the switch element passes through in the axial direction,
wherein the switch element has a first switch toothing arranged axially between the first and second idler gears and a second switch toothing arranged on the side of the first idler gear facing away from the second idler gear,
wherein the first switch toothing is connected to the second switch toothing in a manner fixed against rotation,
wherein, in a first axial position of the switch element, the first switch toothing is configured to couple the first idler gear in a manner fixed against rotation with the second idler gear,
wherein tooth tips of the first and second switch toothing extend radially inward, with regard to the axis of rotation of the shaft, from an interior of the switch element.

9. The transmission device of claim 8, wherein, in a second axial position of the switch element, the second switch toothing is configured to couple the first idler gear in a manner fixed against rotation with the shaft.

10. The transmission device of claim 9, wherein, in a third axial position in relation to the shaft, the switch element is configured to revolve freely with the first idler gear without coupling the second idler gear with the switch element.

* * * * *